United States Patent [19]

Buma et al.

[11] Patent Number: 4,712,775

[45] Date of Patent: Dec. 15, 1987

[54] CONSTRUCTION OF CONTROL VALVE FOR AIR SUSPENSION

[75] Inventors: Shuuichi Buma, Toyota; Osamu Horiyama, Kani, both of Japan

[73] Assignee: Toyota Jidosha Kabushiki Kaisha, Toyota, Japan

[21] Appl. No.: 833,068

[22] Filed: Feb. 26, 1986

[30] Foreign Application Priority Data

Feb. 26, 1985 [JP] Japan ............................ 60-25514[U]

[51] Int. Cl.⁴ .............................................. F16F 3/08
[52] U.S. Cl. ...................................... 267/220; 267/35; 267/64.11; 267/64.25
[58] Field of Search .................. 188/299, 319, 321.11; 267/8 R, 8 B, 8 C, 8 D, 8 A, 9 R, 9 B, 9 A, 9 C, 10, 35, 64.21, 64.24, 64.25, 64.27, 127, 140.1, 120; 137/625.31, 625.32; 251/208, 209; 138/44

[56] References Cited

U.S. PATENT DOCUMENTS

| | | | |
|---|---|---|---|
| 3,116,917 | 1/1964 | Cramer | 267/127 |
| 3,537,543 | 11/1970 | Gibel | 138/44 X |
| 4,194,731 | 3/1980 | Marx | 267/120 X |

FOREIGN PATENT DOCUMENTS

| | | | |
|---|---|---|---|
| 1034488 | 7/1958 | Fed. Rep. of Germany | 267/127 |
| 3509943 | 1/1986 | Fed. Rep. of Germany | 267/35 |
| 59-108857 | 2/1986 | Japan . | |
| 59-104457 | 2/1986 | Japan . | |

*Primary Examiner*—Duane A. Reger
*Assistant Examiner*—Matthew C. Graham
*Attorney, Agent, or Firm*—Oblon, Fisher, Spivak, McClelland, & Maier

[57] ABSTRACT

A construction of a control valve for an air suspension assembly having main and auxiliary air chambers and which include a boundary member disposed between the main and auxiliary air chambers and provided with a path for communicating both air chambers and a valve body disposed in the path. The path or the valve body includes a first path portion and a second path portion having a bore smaller than that of the first path portion. A perforated member is provided in relation with the second path portion of the path or valve body.

6 Claims, 4 Drawing Figures

CONSTRUCTION OF CONTROL VALVE FOR AIR SUSPENSION

BACKGROUND OF THE INVENTION

1. Field of the Invention:

This invention relates to a construction of a control valve for an air suspension assembly.

2. Description of the Prior Art:

Some air suspension assembly have a main air chamber formed to surround an upper portion of a shock absorber and an auxiliary air chamber, both air chambers being filled with compressed air to constitute an air spring while affording and interrupting communication between the main air chamber and the auxiliary air chamber through a valve body to change the volume of air chambers so that the spring constant of the air spring can be adjusted.

In such air suspension assemblies, when the valve body is in a communicating mode, the volume of the main air chamber is increased and decreased along the abrupt vertical movement of the shock absorber due to the force of impact from a road surface so as to provide high speed inflow and outflow of air through a path. Therefore, noise generated from the flow may occur so as to thus generate an uncomfortable feeling to the vehicle passengers.

SUMMARY OF THE INVENTION

The Utility Model Application No. 108857/84 proposed in consideration of the above mentioned discussion relates to a control valve construction for affording and interrupting communication between the main and auxiliary air chambers of an air suspension assembly, which comprises a first perforated member having a plurality of holes opening to said main air chamber, a second perforated member having a plurality of holes opening to said auxiliary air chamber and disposed from said first perforated member through a path or passage and a valve body disposed in said path to afford and interrupt communication to the path.

Now, there is proposed an air suspension in which a path having a plurality of path portions with different bores is provided between the main and auxiliary air chambers to not only afford or interrupt communication between both air chambers, but also change the flow speed of air when both air chambers communicate with each other so that a dynamic spring constant can be adjusted to have a soft and hard characteristic. In this air suspension assembly, when the dynamic spring constant is to be softened, the flow speed needs to be reduced by expanding the area of the path portion so as to be as large as possible. However, if a perforated member is disposed in the path portion, the air flow is throttled by the perforated member so as to increase the flow speed so that the dynamic spring constant cannot be softened to the predetermined value.

On the other hand, according to facts confirmed experimentally, when the dynamic spring constant is to be hardened, i.e., air flows through the path portion having a small bore, abnormal noises take place.

An object of the present invention is to provide a control valve construction for an air suspension assembly which creates no troubles regarding air flow when the air flows through a path portion having a large bore and can restrain the abnormal noises when the air flows through a path portion having a small bore.

According to the present invention, a control valve construction for an air suspension assembly having main and auxiliary air chambers comprises boundary means disposed between the main and auxiliary air chambers and provided with a path for communicating both air chambers and a valve body disposed in said path. The path has a first path portion and a second path portion having a bore smaller than that of the first path portion, or said valve body has a third path portion and a fourth path portion having a bore smaller than that of the third path portion. A perforated member is provided in relation with said second path portion or the fourth path portion.

According to the present invention, since the perforated member is disposed in the hole of path portion having the small bore of path or valve body, the occurrence of abnormal sounds can be prevented in the air flow through the hole without generating an uncomfortable feeling to passengers. Also, since the perforated member is absent in the hole of path portion having the large bore, the flow speed can be reduced so as to be as low as possible in the air flow through this hole and the dynamic spring constant can be set at a predetermined soft setting. Thus, better riding comfort can be provided.

BRIEF DESCRIPTION OF THE DRAWING

The other objects and features of the invention will become apparent from the following description of preferred embodiments of the invention with reference to the accompanying drawings, in which.

DESCRIPTION OF THE PREFERRED EMBODIMENTS

Figure 1:
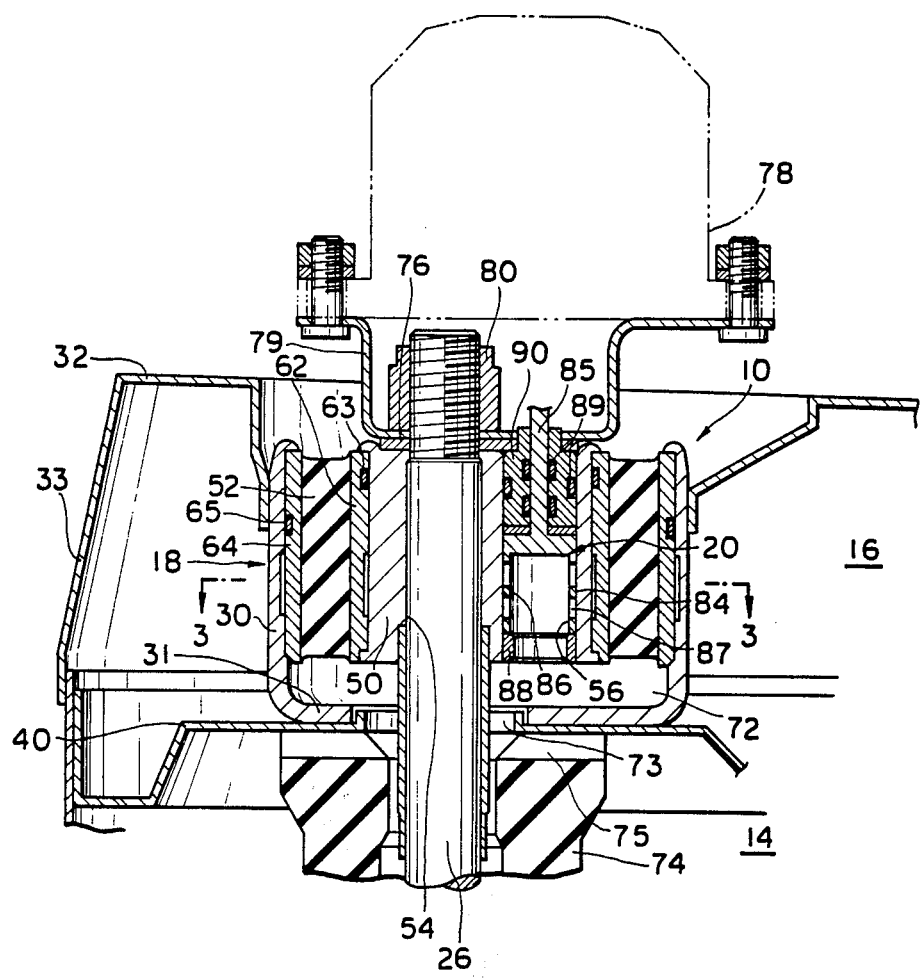
FIG. 1 is a sectional view showing a control valve construction.
Figure 2:
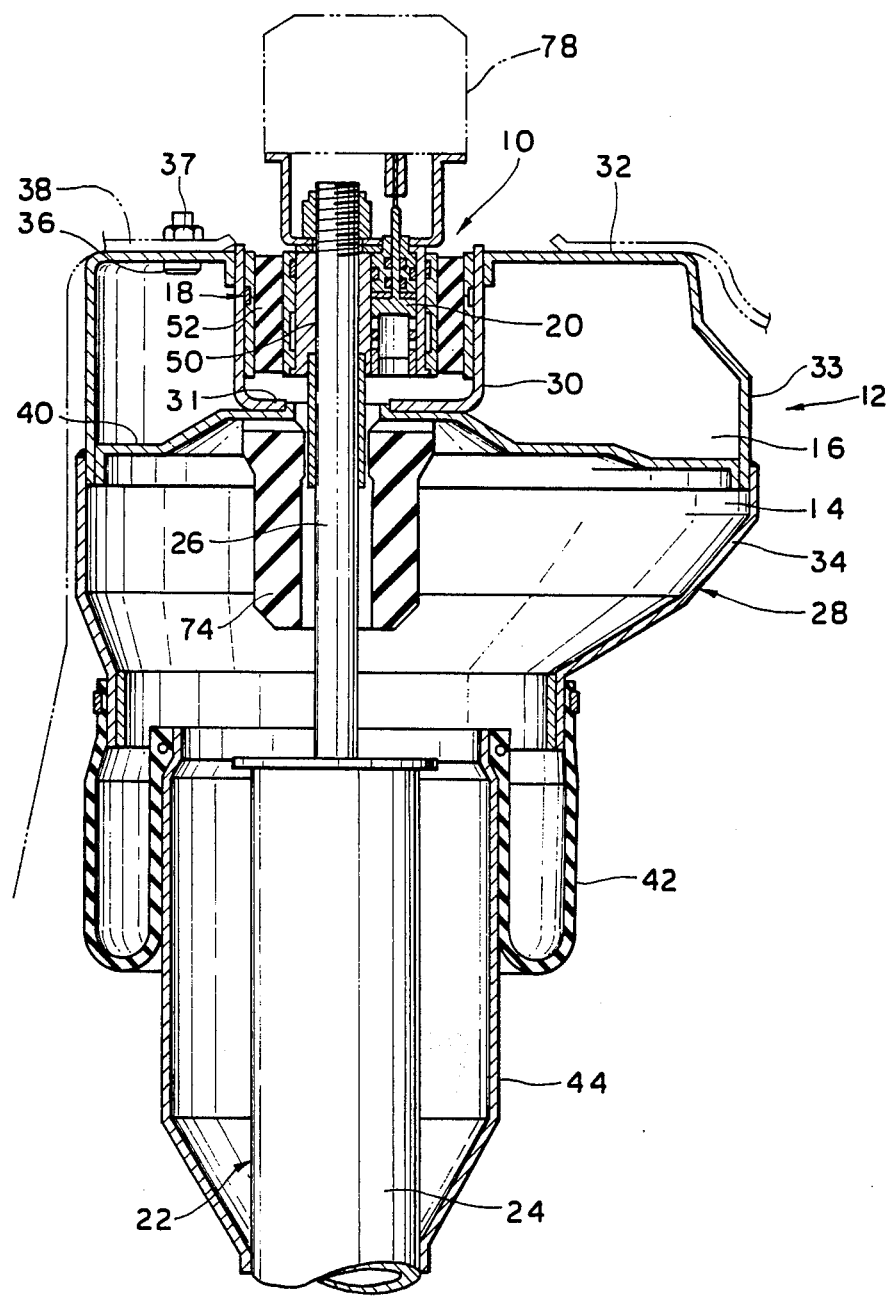
FIG. 2 is a sectional view showing an air suspension assembly incorporating the control valve construction.

As shown in FIGS. 1 and 2, a control valve construction 10 includes boundary means 18 disposed between a main air chamber 14 and an auxiliary air chamber 16 of an air suspension 12 and a valve body 20 disposed in the boundary means 18.

In the embodiment shown, the main and auxiliary air chambers 14,16 are formed so as to surround an upper end of a shock absorber 22 and are filled with compressed air to constitute an air spring.

The shock absorber 22 which is well known per se is provided with a cylinder 24, a piston (not shown) and a piston rod 26 connected to the piston to project from the cylinder 24 to the outside. The shock absorber 22 is connected to a suspension arm (not shown) on a lower end.

A housing 28 for forming the air chamber has a flat annular ceiling portion 32 welded on an inner peripheral edge to the entire periphery of a cylindrical member 30 of the boundary member 18, a first tubular portion 33 integrally extending from the ceiling portion and a second tubular portion 34. A plurality of bolts 36 (only one of them is shown in FIG. 2) welded with airtightness to the ceiling portion 32 of the housing 28 extend through a car body 38 and nuts 37 are screwed onto the bolts 36 to connect the housing 28 with the car body 38. To the entire periphery of the first tubular portion 33 of the housing 28 is welded to an outer peripheral edge of a partition 40. An inner peripheral edge of the partition 40 is welded to the entire periphery of a flange 31 of the cylindrical member 30. The second tubular portion 34 of the housing 28 is fitted onto the first tubular portion 33 and welded thereto over the entire periphery.

A diaphragm 42 is formed of cylindrical rubber and folded back at an approximately middle portion so that outside and inside ends thereof are fixed respectively to the second tubular portion 34 of the housing 28 and a cylindrical air piston 44 welded to the cylinder 24. As a result, the main and auxiliary air chambers 14,16 are defined respectively beneath and above the partition 40.

The boundary means 18 is provided with a valve receiving body 50 formed of rigid material, a bushing 52 formed of rubber and said cylindrical member 30 formed of rigid material. In the embodiment shown, the boundary means 18 holds the valve body 20 for affording and interrupting communication between the main and auxiliary air chambers 14,16 while serving to support the piston rod 26.

Figure 3:
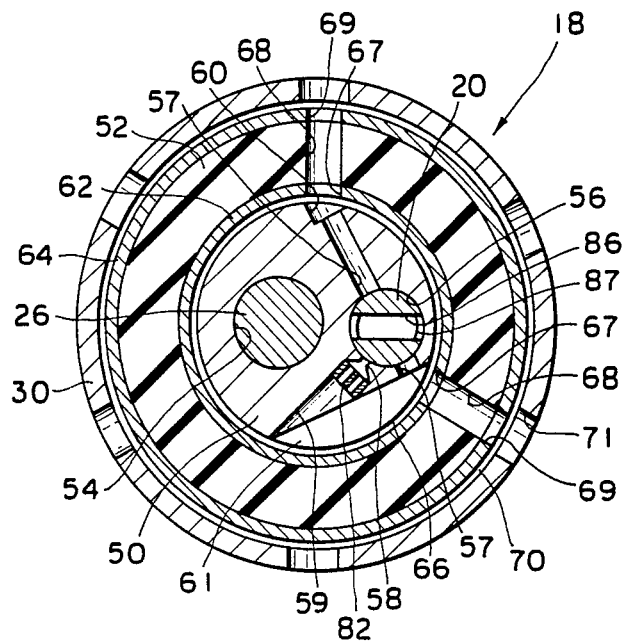
FIG. 3 is a sectional view taken along the line 3—3 in FIG. 1.

As shown in FIG. 3, the valve receiving body 50 is provided with a hole 54 through which the piston rod 26 extends, a hole 56 extending parallel to the hole 54 for receiving the valve body 20, a pair of holes 57 extending toward an outer peripheral surface diametrally from the hole 56 and a hole 58 spaced circumferentially from a pair of holes 57, extending from the hole 56 toward an outer peripheral surface and having a small bore. To the outer portion of the hole 58 is connected a hole 59 having an enlarged bore. One of a pair of holes 57 is connected to a notch 60 and the other of pair of holes 57 and the hole 59 are connected respectively to a notch 61.

The bushing 52 is vulcanized and bonded to inner and outer tubes 62,64. The valve receiving body 50 is press fitted in the inner tube 62 mounting an O-ring 63, and the outer tube 64 mounting an O-ring 65 is press fitted in the cylindrical member 30. The inner tube 62 has a groove 66 extending around the whole periphery at a position of an inner peripheral surface opposed to the notches 60,61 of the valve receiving body 50 and holes 67 extending from the groove 66 to an outer peripheral surface. The bushing 52 has a plurality of holes 68 extending from an inner peripheral surface to an outer peripheral surface at positions opposed to the respective holes 67 of the inner tube 62, and the outer tube 64 has holes 69 extending from an inner peripheral surface to an outer peripheral surface at positions opposed to the respective holes 68 of the bushing 52. The cylindrical member 30 has a groove 70 extending around the whole periphery at a position of an inner peripheral surface opposed to the holes 69 of the outer tube 64 and holes 71 extending from the groove 70 to an outer peripheral surface.

The holes 71 of the cylindrical member 30 open to the auxiliary air chamber 16. On the other hand, the hole 56 of the valve receiving body 50 opens to a space 72 surrounded by the flange 31 of the cylindrical member 30 and communicating to the main air chamber 14 through a gap 73 between the flange 31 and the piston rod 26 and a hole 75 provided in a bound stopper 74. As a result, a path from the main air chamber 14 to the auxiliary air chamber 16 is constituted from said various holes provided in the boundary member 18.

The piston rod 26 extends through the hole 54 of the valve receiving body 50, a washer 76 and a bracket 79 of an actuator 78 are disposed on the upper side of said body 50 and a nut 80 is screwed onto the piston rod 26 to connect the piston rod 26 with the valve receiving body 50.

A perforated member 82 is disposed in the hole 59 of the valve receiving body 50 to restrain the occurrence of abnormal noises when air flows through the hole 58 having the small bore. The perforated member 82 is provided with a plurality of holes extending in the axial direction of the hole 58.

The valve body 20 has integrally a slide portion 84 and an operating portion 85 extending upward, the slide portion 84 being provided with a recess 86 and holes 87 extending radially from the recess to an outer peripheral surface. The recess 86 opens to the space 72 and the holes 87 can communicate to the holes 57,58 of the valve receiving body 50. The valve body 20 is inserted in the hole 56 of the valve receiving body 50 and rotatably held in the hole 56 with airtightness by a cylindrical holder 88 press fitted in the lower portion of the hole 56 and a holder 90 disposed in the upper portion of the hole 56 and having O-rings 89 mounted on inner and outer peripheral surfaces. An output shaft of the actuator 78 well known per se and consisting of a motor and a reduction gear is nonrotatably connected with the operating portion 85 of the valve body 20.

When the valve body 20 is located in the interrupting position shown in FIG. 3, only the main air chamber 14 is subjected to spring action so that the spring constant of the air spring is large. When the valve body 20 is rotated by 60°, the main air chamber 14 communicates to the auxiliary air chamber 16 through a pair of holes 57 of large path portions and then since the pair of holes 57 resist little to air flow, the spring constant of the air spring is small. When the valve body 20 is rotated further by 60°, the main air chamber 14 communicates to the auxiliary air chamber 16 through the hole 58 of small path portion. Since the hole 58 then provides large resistance to the air flow, the spring constant of the air spring is at a medium level.

Figure 4:
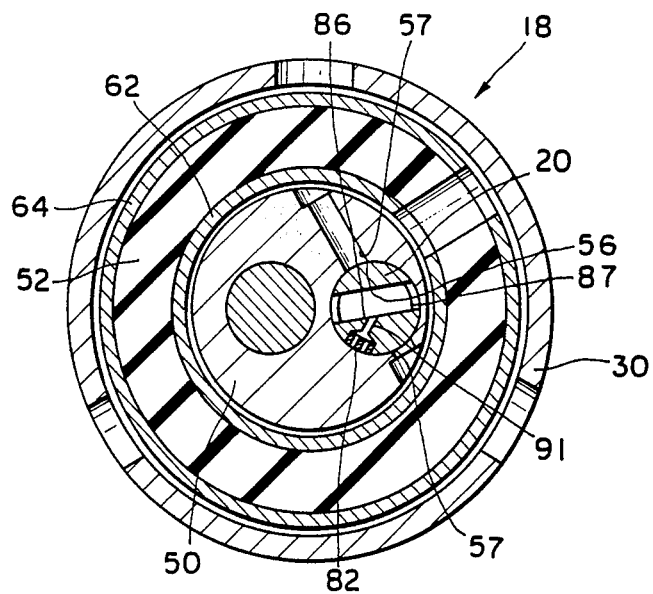
FIG. 4 is a sectional view similar to that in FIG. 3, showing a further embodiment.

In the embodiment shown in FIG. 4, the valve receiving body 50 has a pair of holes 57 extending from the hole 56 to the outer peripheral surface. On the other hand, the valve body 20 disposed in the hole 56 has the recess 86, the holes 87 extending from the recess 86 to the outer peripheral surface and a hole 91 having a bore smaller than that of the hole 87. The perforated member 82 is disposed in an enlarged diameter portion communicating to the hole 91. The constitution of other parts in this embodiment is as same as the above mentioned.

What is claimed is:

1. A control valve in combination with an air suspension assembly having main and auxiliary air chambers comprising:
    boundary means disposed between said main air chamber and said auxiliary air chamber and provided with passage means for communicating between both air chambers, the path including a first passage, a second passage having a bore smaller than that of the first passage and a third passage;
    a sound muffling perforated member having a plurality of perforations provided solely in relation witgh said second passage of said passage means for muffling noise generated by air flow therethrough; and
    a valve body selectively interconnecting said first and second and said first and third passages for affording and interrupting communication between said main air chamber and said auxiliary air chamber wherein each of said air chambers are communicated through one of said first and second passages when said valve body is in a predetermined position and the other of said first and second passages is closed by said valve body.

2. A construction of a control valve as claimed in claim 1, wherein said plurality of perforations in said perforated member extend in an axial direction of the second path portion.

3. A control valve in combination with an air suspension assembly having main and auxiliary air chambers, comprising:

boundary means disposed between said main air chamber and said auxiliary air chamber and provided with passage means for communicating both air chambers said passage means including a first and second passage;

a valve body disposed in said passage means for selectively interconnecting said first and second passages for affording and interrupting communication between said main air chamber and said auxiliary air chamber, the valve body including a third passage and a fourth passages having a bore smaller than that of the third passage; and a sound muffling perforated member having a plurality of perforations and provided solely in relation with said fourth passage of said valve body wherein each of said air chambers are communicated through one of said first and second passages when said valve body is in a predetermined position and the other of said first and second passages is closed by said boundary means.

4. A control valve as claimed in claim 3, wherein said plurality of perforations in said perforated member extend in an axial direction of the fourth passage.

5. A control valve in combination with an air suspension assembly which has main and auxiliary air chambers, both air chambers being formed to surround a shock absorber comprising:

boundary means disposed between said main air chamber and said auxiliary air chamber and including a rigid member to which a piston rod of said shock absorber is connected, a rubber bushing disposed outside the rigid member and a connecting member disposed outside the bushing, the boundary means being provided with passage means for communicating both air chambers extending through said rigid member, bushing and connecting member, the passage means including a first passage and a second passage having a bore smaller than that of the first passage and a third passage;

a second muffling perforated member having a plurality of perforations provided solely in relation with said second passage of said passage means for muffling noise generated by air flow therethrough; and a valve body selectively interconnecting said first and second and said first and third passages for affording and interrupting communication between said main air chamber and said auxiliary air chamber wherein each of said air chambers are communicated through one of said first and second passages when said valve body is in a predetermined position and the other of said first and second passages is closed by said valve body.

6. A control valve in combination with an air suspension assembly which has main and auxiliary air chambers, both air chambers being formed to surround a shock absorber comprising:

boundary means disposed between said main air chamber and said auxiliary air chamber and including a rigid member to which a piston rod of said shock absorber is connected, a rubber bushing disposed outside the rigid member and a connecting member disposed outside the bushing, the boundary means being provided with passage means for communicating both air chambers extending through said rigid member, bushing and connecting member;

a valve body disposed in said rigid member of the means for affording and interrupting communication between said main air chamber and said auxiliary air chamber and provided with passage means including a first passage and a second passage having a bore smaller than that of the first passage; and a sound muffling perforated member having a plurality of perforations disposed solely in said second passage of said valve body for muffling noise generated by air flow therethrough wherein each of said air chambers are communicated through one of said first and second passages when said valve body is in a predetermined position and the other of said first and second passages is closed by said boundary means.

* * * * *